Patented Apr. 25, 1933

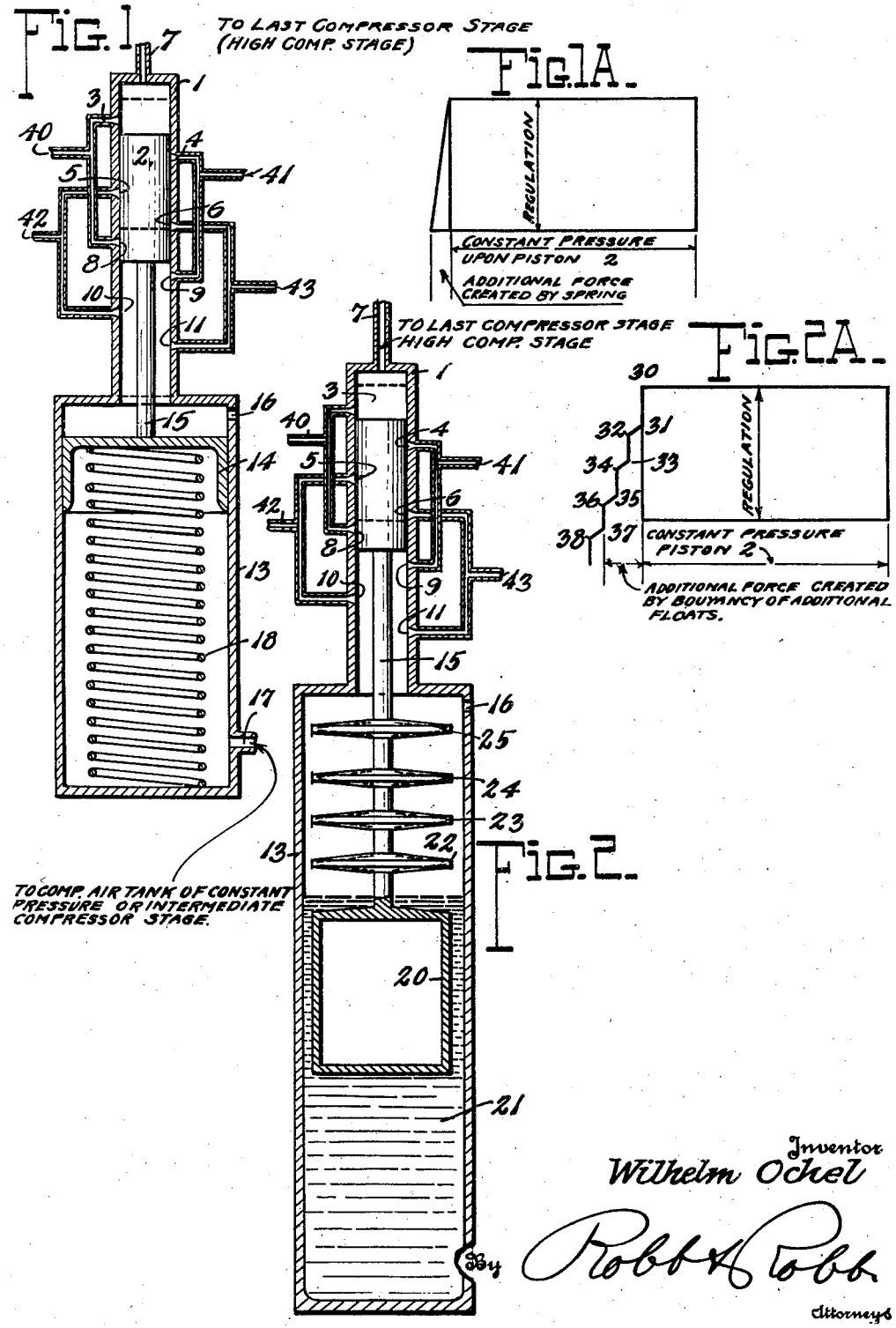

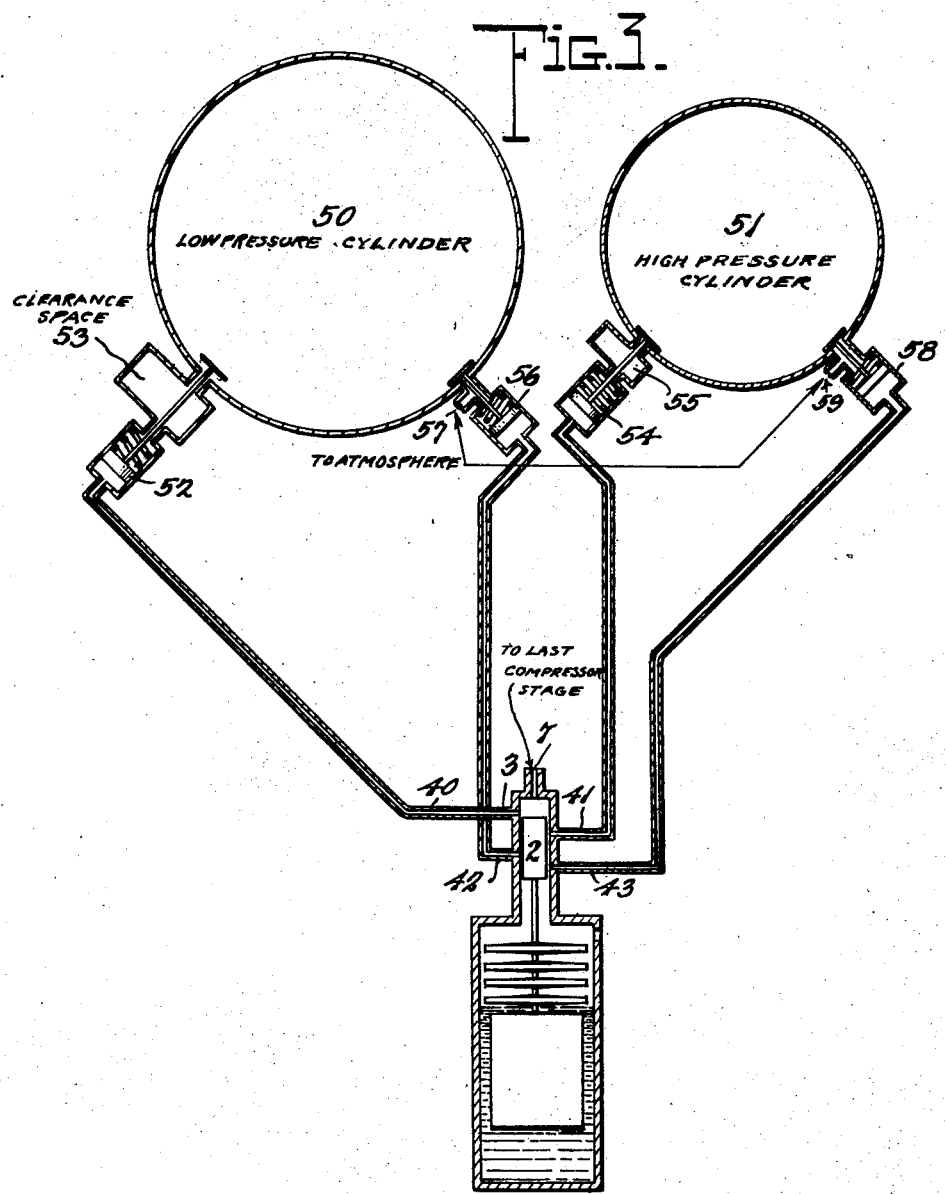

1,906,012

UNITED STATES PATENT OFFICE

WILHELM OCHEL, OF BERLIN-TEGEL, GERMANY, ASSIGNOR TO A. BORSIG, G. M. B. H., OF BERLIN-TEGEL, GERMANY

REGULATOR FOR MULTISTAGE COMPRESSOR SYSTEMS

Application filed December 2, 1931, Serial No. 578,579, and in Austria October 1, 1930.

This invention relates to improvements in regulators for multi-stage compressor systems.

The regulation of the output of one or more stage compressors is accomplished today by means of a regulator which consists of a contact pressure meter actuated by compressed air from the compression tank of the high pressure stage. The said contact pressure meter controls the output of the compressor, stage by stage, by means of an electrical control apparatus which operates the suction valves so as to keep them open and to thereby reduce the output of the machine. The same result may be also accomplished by adding a clearance space to the respective stages of the compressor.

This arrangement has the disadvantage that a separate source of power is necessary for the operation of the regulator instrumentalities, and a further disadvantage is the very complicated construction of such a regulator, which consists of many parts, which cause improper regulation of the machine.

Especially, the proper operation of the contact pressure meter is not attained, as the continuous switching of its contacting instrumentalities produces an electrical destruction of the contacts.

A simple mechanical control of a stage by stage output regulation for air compressors has heretofore never been accomplished to my knowledge. But, nevertheless, such mechanical regulation is possible. It may be accomplished in the following manner.—

A control piston is brought under the influence of the pressure in the highest stage of the compressor and held in equilibrium by means of a weight. When the pressure of the highest stage is increased, the control piston will then move against the force of the weight. The control piston will now during its course of travel close and open passages in successive order so that the regulating instrumentalities may be operated by the compressed air of the last stage so as to disconnect certain stages; or the same result may be accomplished by addition of clearance space to the cylinder volume of the respective stage or stages.

A regulator of such construction will not operate properly because of the very great masses to be moved and therefore an adjustment within the very small control limits is practically impossible. It is, of course, possible to reduce the masses,—consequently the inertia of the same, by the use of springs, but the springs would have to have, notwithstanding their great resistance equal to the pressure of the high pressure stage, a considerable amount of flexibility to secure the sensitiveness necessary for the operation of the control piston, and this represents a great constructive difficulty.

For instance, if the pressure in the last stage is 8kg./cm.$^2$,—the spring must be made to resist such pressure. By a pressure increase within the limit of $\frac{1}{2}$kg./cm.$^2$, four stages have to be disconnected and therefore the travel of the control piston which is directly proportional to the compression of the spring will be too small to permit an exact regulation. When the travel of the control piston is increased by the use of a lever system, a proper operation can not be attained, and the inertia of the regulation device is increased.

However, it has now been discovered by me that a proper and exact mechanical regulation is possible when the pressure of the last compressor stage acting upon one side of the control piston, is balanced by a constant counter-force without great inertia. This may be accomplished by the use of the pressure of an intermediate stage of the compressor, or by a counter-force taken from a tank with constant pressure, or by means of the buoyancy of a float. The over-pressure caused by the increase of the pressure of the last compressor stage is balanced within the control limits of the control piston by means of a counter-force with little or no inertia. This counter-force may be created by a spring, compressed air or by additional floats of very light weight.

In the drawings, Figure 1 shows a diagrammatic view of a stage by stage output regulation of a compressor, wherein the counter-force which balances the pressure of the last stage is the pressure of an intermediate stage of the compressor, and wherein the counter-force necessary for the control operation of the control piston is produced by a spring.

Figure 1a illustrates a diagram of the regulator operation of the device shown in Figure 1.

Figure 2 illustrates a diagrammatic showing of a modified construction wherein the counter-force is produced by the buoyancy of a float of very light weight, while the counter-force necessary for the proper control operation of the piston is created by additional floats.

Figure 2a is a diagram of the regulation action of the regulator shown in Figure 2.

Figure 3 is a diagrammatic illustration of the regulator shown in Figure 2 connected with the high and low pressure stage of a compressor, showing the instrumentalities which govern the operation of the valves.

Referring now to the drawings, 1 illustrates the cylinder of an output regulator having a piston 2 slidably mounted therein. Within the cylinder 1 are inlet passages indicated by the numerals 3, 4, 5, and 6. The outlet passages of the said cylinder 1 are indicated at 8, 9, 10, and 11. The inlet passage 3 is connected with the outlet passage 8 and the inlet passage 4 is connected with the outlet passage 9 while the inlet passages 5 and 6 are connected with the outlet passages 10 and 11 respectively.

The cylinder 1 is connected with the high compression stage of the compressor by means of a pipe 7. The lower portion of the control cylinder 1 opens into a cylinder 13 having a piston 14 mounted therein, upon which a constant counter-force is applied. The cylinder 13 is provided with an outlet opening 16 and an inlet opening 17. Compressed air of constant pressure is introduced into the cylinder 13 through the opening 17 and will act upon the piston 14, balancing the same against the pressure of the highest compression stage introduced in the cylinder 1 through the pipe 7. The piston 14 is connected with the piston 2 by means of a connecting rod 15. Interposed between the bottom wall of the cylinder 13 and the piston 14 is a helical spring 18. Pipes 40, 41, 42, and 43 are adapted to connect the passages of the control cylinder 1 with controlling instrumentalities which will be mentioned later on.

Referring now to Figure 3, it will be seen that the low pressure cylinder 50 of the compressor is provided with a valve 52 which is adapted to connect or disconnect the said cylinder with a clearance space 53. The valve 52 is actuated by means of compressed air passing from the control cylinder 1 through the passage 3 and the pipe 40, acting directly upon the said valve instrumentality.

The low pressure cylinder is further provided with a valve 56 controlling an opening 57 leading to atmosphere. The valve 56 is connected with the control cylinder 1 by means of a pipe 42 and the passages 5 and 10 similarly to the connection of the valve 52 therewith.

A valve 54 of the same construction as the valve 52 is provided in the high pressure cylinder 51 of the compressor and is adapted to connect the said cylinder with a clearance space 55. A pipe 41 connects the valve 54 with the passages 4 and 9 in the control cylinder 1. The cylinder 51 of the compressor is further provided with a valve 58 having an outlet 59. This valve is similar to the valve 56 and controls the passages 6 and 11 in the control cylinder through the pipe 43.

Figure 2 shows a modified structure of the device as shown in Figure 1, and is practically of the same construction, with the exception that instead of the piston 14 and the spring 18, a float 20 is used, adapted to be immersed in mercury, as shown at 21, with which the cylinder 13 is partially filled. The connecting rod 15 which connects the float 20 with the control piston 2 is somewhat longer than in the construction shown in Figure 1 and is adapted to carry additional floats 22, 23, 24, and 25.

In the diagram shown in Figure 2a, the numerals 30—31, 32—33, 34—35, 36—37 are the control movements of the piston which will be referred to more particularly as the description proceeds.

The operation of the device is as follows:

The pressure of the highest stage of the compressor is introduced through pipe 7 into the control cylinder 1 acting upon the piston 2 which is connected by means of the connecting rod 15, with the piston 14 in the cylinder 13. The piston 14 receives a constant pressure from an intermediate compressor stage through the opening 17, or the said pressure may be taken from a tank containing compressed air of a constant pressure.

When the pressure in the last compressor stage is 8kg./cm.$^2$, the pressure upon the piston 2 will be equal to the pressure upon the piston 14, and the control piston 2 will have assumed such a position in which the passages 3, 4, 5, and 6 are closed while the passages 8, 9, 10, and 11 are open. Compressed air which may leak around the piston 2 can escape through passages 8, 9, 10, and 11, and through the outlet opening 16 in the cylinder 13, to atmosphere. Therefore, it is impossible for a collection of leaking air to be stored in the pipes 40, 41, 42, and 43 which are in connection with the passages 3—8, 4—9, 5—10, or 6—11, so that an accidental and undesired regulation of the compressor may be entirely eliminated.

When the pressure of the highest stage is raised above 8kg./cm.$^2$, the pistons 2 and 14 will be moved into another position, which in turn will cause the compression of the spring 18. This spring 18 is only for the purpose of equalizing the pressure above 8kg./cm.$^2$, and may be made, therefore, of very flexible material so that a slight change in pressure will cause a considerable compression of the spring. This will assure a long control travel of piston 2 which is necessary to perform a proper regulation. The displacement of piston 2 under the influence of additional pressure will first close the passage 8 and then open the passage 3. The compressed air above the piston 2 within the control cylinder 1 is now permitted to enter into the pipe 40 through the passage 3 and to operate the instrumentalities which directly control the output of the compressor. The piston is now in the position illustrated in Figure 1.

It should be noted that leaking air may escape through the passages 9, 10, 11 and through the outlet 16 in the cylinder 13 so that, as previously stated, an undesirable operation of the regulating instrumentalities, by means of the leaking air, will be eliminated.

If the pressure of the highest stage should further increase, the passages 4, 5, and 6 will be opened in successive order, whereby their respective discharge passages 9, 10, and 11 will be closed. The discharge passages 8, 9, 10, and 11, respectively, will be closed before their corresponding inlet passage is opened. When the passages 3, 4, 5, and 6 are opened, the output of the compressor will be zero, as will be more clearly understood from the following description.

Assuming the pressure of the highest stage drops down, the piston 2 will return under the influence of the spring 18 and will close the inlet passage 6 and the outlet passage 11 until a further reduction of the pressure in the compressor has taken place. If this is accomplished, the outlet passage 11 will be opened and the regulation instrumentalities of the respective stage connected with the pipe 43 will be released. Further decrease of pressure will operate the control of the regulation instrumentalities of the other stages until the control piston 2 is returned to its original position.

The diagram in Figure 1a illustrates clearly the regulator operation and indicates the equal motion of the control piston under the influence of the spring.

The regulation device shown in Figure 2 operates in the same manner as the device shown in Figure 1 but instead of piston 14 and spring 18, a float 20 is to be used. The float 20 is made of very light material and has little inertia. The cylinder 13 is partially filled with mercury as shown at 21, and the buoyancy of the float 20, if entirely immersed in the mercury, is equal to the pressure of the highest stage of the compressor. Mercury is selected because of its great mobility and because it will not adhere to the float.

A plurality of additional floats 22, 23, 24, and 25 are provided to increase the buoyancy of the float 20 which is necessary to respond to the various pressure conditions, previously mentioned in connection with Figure 1. Therefore, if the float 20 is immersed in mercury and the pressure above the piston 2 is raised, the additional float 22 will be dipped into the mercury and the motion of the piston will close and open the passages 8 and 3 in the same manner previously described so that the regulating instrumentalities of the different stages may be operated corresponding to the travel of the control piston 2.

The connecting rod 15 will cause only a slight increase of the buoyancy and this very small additional buoyancy may be therefore ignored.

It will be seen from the diagram in Figure 2a that the counter-force caused by the buoyancy of the floats does not raise proportionately to the motion of the control piston 2 as was the case in the device shown in Figure 1. It is here in this modified construction more a step by step operation, and therefore to prevent a slow opening and closing of the passages it is necessary to arrange the passages within the cylinder 1 at such places where the smallest increase of pressure will cause the longest travel of the control piston.

To reduce the breaking action, and to permit an easier shedding of the mercury from the floats, they are made preferably slightly conical.

The regulation of the compressor, which is performed by disconnection of stages or by addition of clearance space, is shown in Figure 3. The pipe 40 connects a valve 52 which is mounted on the low pressure cylinder with the cylinder 1 and permits the addition of clearance space 53 to the volume of the said low pressure cylinder if the piston 2 is in the respective position which will effect such operation. The pipe 41 connects in a like manner the valve 54 and clearance space 55 on the high pressure cylinder 51 with the control cylinder 1. When the piston 2 is in a position which will permit the passage of compressed air from the cylinder 1 through the pipe 40 to the valve 52, the same will be opened and the clearance space 53 will be added to the volume of the low pressure cylinder. In a like manner, the valve 54 will add the clearance space 55 to the volume of the high pressure cylinder 51.

Should the pressure in the highest stage of the compressor further increase, the valves 56 and 58 will be opened, which will first connect the low pressure cylinder 50 with atmosphere by means of the valves 56 and 57, and then the valve 58 will become operative so that finally the high pressure cylinder also becomes connected to atmosphere by means of the outlet 59. The output of the compressor will now be zero.

Dropping of the pressure in the cylinder 1 will permit the piston 2 to return to its original position step by step as the pressure decreases, bringing one stage after the other back to full effective operation.

Having thus described my invention, what I claim as new and desire to secure by Letters Patent of the United States, is—

1. A regulator for air compressor systems, comprising a cylinder, a piston therein responsive to variations in the pressure of the system, means for counterbalancing the normal high pressure of the system, and separate counterbalancing means coacting with the piston for counterbalancing excess pressure in the compressor system.

2. A regulator for air compressor systems, comprising a cylinder, a control piston therein responsive to variations in the pressure of the system, a counterbalancing piston connected to said control piston and operative from a source of constant pressure supply in opposed relation to the pressure acting upon the control piston, and a spring coacting with the counterbalancing piston to regulate the control piston when affected by excess pressure.

3. A regulator for air compressor systems, as claimed in claim 1 wherein the high pressure counterbalancing means comprises a float connected to the control piston and said separate means comprise auxiliary floats.

4. A regulator for air compressor systems comprising a cylinder, a control piston therein responsive to variations in the high pressure of said system, said cylinder having a series of inlets and outlets arranged to be successively controlled by said piston, fluid operated means for counterbalancing the high pressure, and auxiliary means cooperative with the last mentioned means for counterbalancing the excess pressure of the system.

5. A regulator as claimed in claim 4, wherein the outlets and inlets are so arranged that said outlets are closed before their respective inlets are opened, each set of outlet and inlet intercommunicating to permit escape to atmosphre of the pressure passing the piston.

In testimony whereof I affix my signature.

WILHELM OCHEL.